June 18, 1957 R. B. SCHULZE ET AL 2,796,253
CUSHION CONTROL SYSTEM FOR A PRESS
Original Filed June 3, 1948 6 Sheets-Sheet 6

Inventors
Richard B. Schulze
Henry P. Hessler
Clarence M. Davison, Deceased
by Sally L. Davison
Administratrix, Mahlon A. Winter
By Donald W. Farrington
Attorney United States Patent Office 2,796,253
Patented June 18, 1957

2,796,253

CUSHION CONTROL SYSTEM FOR A PRESS

Richard B. Schulze, Towson, and Henry P. Hessler, Baltimore, Md., and Clarence M. Davison, deceased, late of Baltimore, Md., by Sally L. Davison, administratrix, Baltimore, and Mahlon A. Winter, Baltimore, Md., assignors to The Glenn L. Martin Company, Middle River, Md., a corporation of Maryland Original application June 3, 1948, Serial No. 30,766. Divided and this application May 22, 1953, Serial No. 356,722

5 Claims. (Cl. 267—1)

This application relates to an improved cushion control system for a press and is a division of the co-pending application of Richard B. Schulze, Henry P. Hessler, Clarence M. Davison and Mahlon A. Winter, entitled "Method and Apparatus for Controlled Pressure Forming of Sheet Material," filed June 3, 1948, and bearing Serial No. 30,766, now abandoned.

The invention relates to an apparatus to be used in conjunction with a conventional hydraulic press for the purpose of shaping parts of sheet metal, or similar material, over a form block or die. The invention relates to improved structure and techniques involving the rubber forming process for metal which has been previously used with some success in limited applications. The inherent disadvantage of known rubber pressure pad forming operations is that the parts formed are limited to large radius curvatures and shallow depths of form. It is possible by known apparatus to form reinforcing ribs and beads, and punch out lightening holes from plane areas, but where it is required to make a deep flange or draw, the sheet metal wrinkles so badly that hand operations are usually required if the part is to be used at all.

It is an object of this invention to provide apparatus to form sheet metal to compound curvatures and with deep drawn flanges by the use of a rubber pressure pad and a form block mounted in a manner to preclude wrinkling of the metal during the forming operation.

It is another object of this invention to form sheet metal in the manner described above with apparatus that permits control of the forming pressure in a predetermined sequence during the forming operation.

It is another object of this invention to provide an apparatus for the forming of sheet metal by means of a rubber pressure pad wherein the movement of the hydraulic press head is the only source of pressure required for the forming operation.

It is another object of the invention to arrange the apparatus for the forming of sheet metal so that a variety of sequential operations, that is, control of the amounts of pressure with respect to the depth of the draw may be obtained without the application of any fluid pressure to the apparatus other than that generated by the movement of the hydraulic press.

It is another object of this invention to provide a sheet metal forming apparatus in which the expense and time involved in setting up the apparatus for a particular part is a minimum.

It is a further object of this invention to provide a sheet metal forming apparatus wherein form blocks and corresponding templets can be arranged on the same working base with relative flexibility.

Further and other objects of this invention will become apparent from the description of the accompanying drawings which form a part of this disclosure and wherein like numerals refer to like parts.

Apparatus employing a rubber pad and form block in a press has been used for the forming of sheet metal parts. The apparatus of this invention embodies a particular arrangement of rubber forming pad and the supporting and related structure for the form block to effect results not possible with apparatus previously used in sheet metal forming.

The apparatus of this invention consists of a head 1 for a rubber pressure pad generally indicated as 2. The head supporting the pad is secured to the upper movable platen of a conventional hydraulic press generally indicated as 3. The form-block-supporting member, or base, generally indicated as 4, is mounted on the base or bed 5 of the hydraulic press.

The head consists of a mounting plate 30 for securing it to the upper platen of the press. Wall 31 is secured to plate 30 and forms a box-like structure for retaining the rubber pad. Sealing ring 32 is secured to wall 31 and has an aperture 33 slightly smaller than the cavity to retain the rubber pad. This aperture 33 conforms to the contour of filler member 29 and makes a sliding fit with the periphery of the bolster plate 21.

Figure 1:
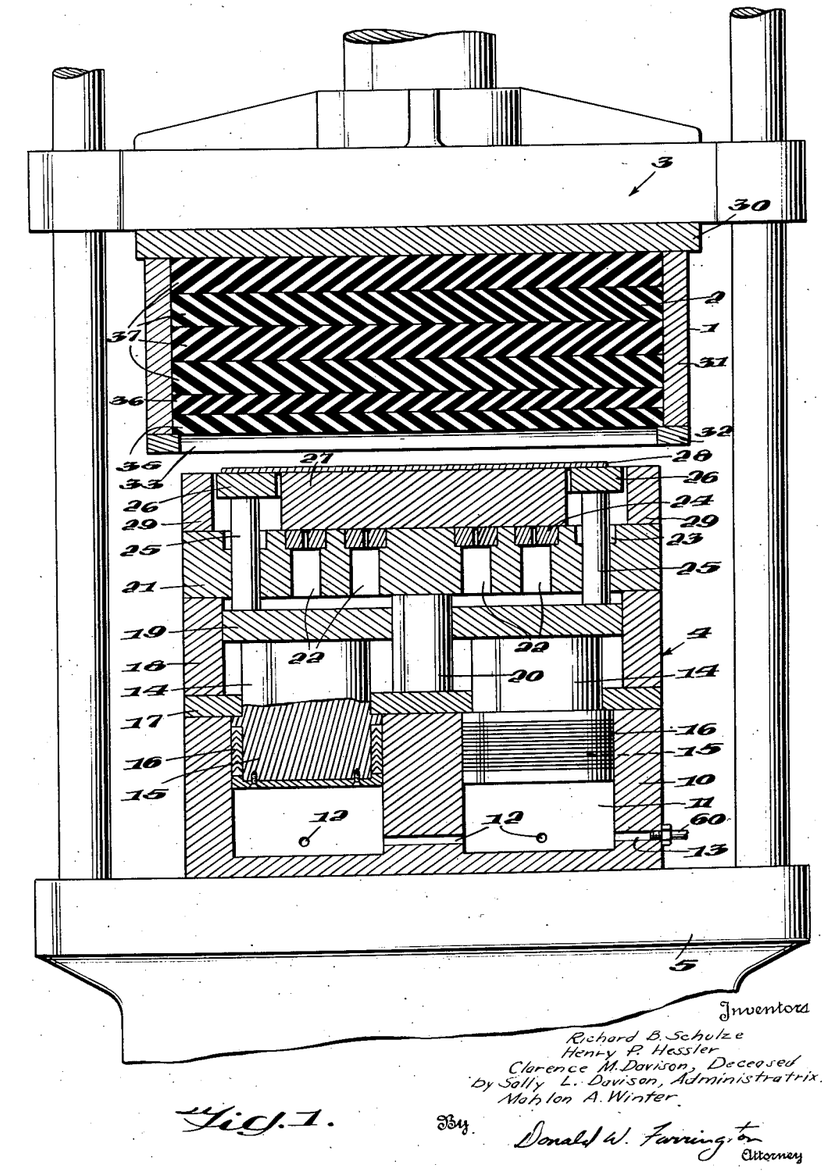
Figure 1 is a sectional view through the sheet metal forming apparatus mounted in a conventional hydraulic press.

The rubber pad may be made up of several layers of rubber or rubber-like material. It is necessary that the elastomeric material be of such a durometer that the material will flow around and form the metal for a considerable depth of the die block. It must be of such elastic properties that the distortion of the material will not destroy its ability to return to the laminar sheet construction, illustrated in Figure 1. An example of the type of rubber pad employed for this purpose would be a composite rubber block made up of several layers. This is illustrated in Figure 1 wherein layer 35 is of rubber-like material about one inch thick of 40 durometer. The next layer 36 is of one inch material of 70 durometer. Backing these layers are layers 37 about one and one half inches thick each, of 40 durometer elastomeric material.

Base member 4 consists of a cylinder block 10 having formed therein four symmetrically spaced cylinders 11. The cylinders are interconnected by passages 12. Passage 13 interconnects the four cylinders with the hydraulic control system, which will be later described. Pistons 14 have enlarged lower portions 15 and are mounted in cylinders 11. A peripheral, annular, chevron seal 16 makes the fit of the pistons in the cylinders fluid-tight. A piston hold-down plate 17 is apertured so that the smaller portion of piston 14 extends therethrough. Plate 17 is intended to limit the travel of the pistons in the cylinders. Side member 18 is mounted on top of plate 17 and surrounds a movable platform 19. This platform rests on pistons 14 and is moved thereby. A bolster plate 21 rests on side member 18 and is supported by center post 20. Bolster plate 21 is formed with a series of apertures 22 throughout the surface extending over the area covered by movable platform 19. Apertures 22 are enlarged at the top surface of the bolster plate as shown at 23. Posts 25 extend through apertures 22 and rest on movable platform 19. Plugs 24 are placed in the enlarged portion of the apertures 22 which are not in use. Posts 25 support a templet 26.

The die or forming block 27 can be designed to any desired shape or contour and is positioned on bolster plate 21. Templet 26 surrounds die block 27. Posts 25 support templet 26 so that the top surface of the templet is generally coplanar with the top surface of die block 27. A sheet of metal to be formed is shown at 28. Member 29 may be a unitary or sectional filler block that fills the space surrounding templet 26 and die block 27. The filler members vary with the part being formed or the forming apparatus. In the form of the invention shown in Figure 9 such filler members are not required. If die block 27 is small, templet 26 will be small in a like manner. Posts 25 will be moved to holes near the center of the bolster plate to support the smaller templet 26. Members 29, therefore, will be larger to fill up the space around the die block and templet assembly.

Figure 2:
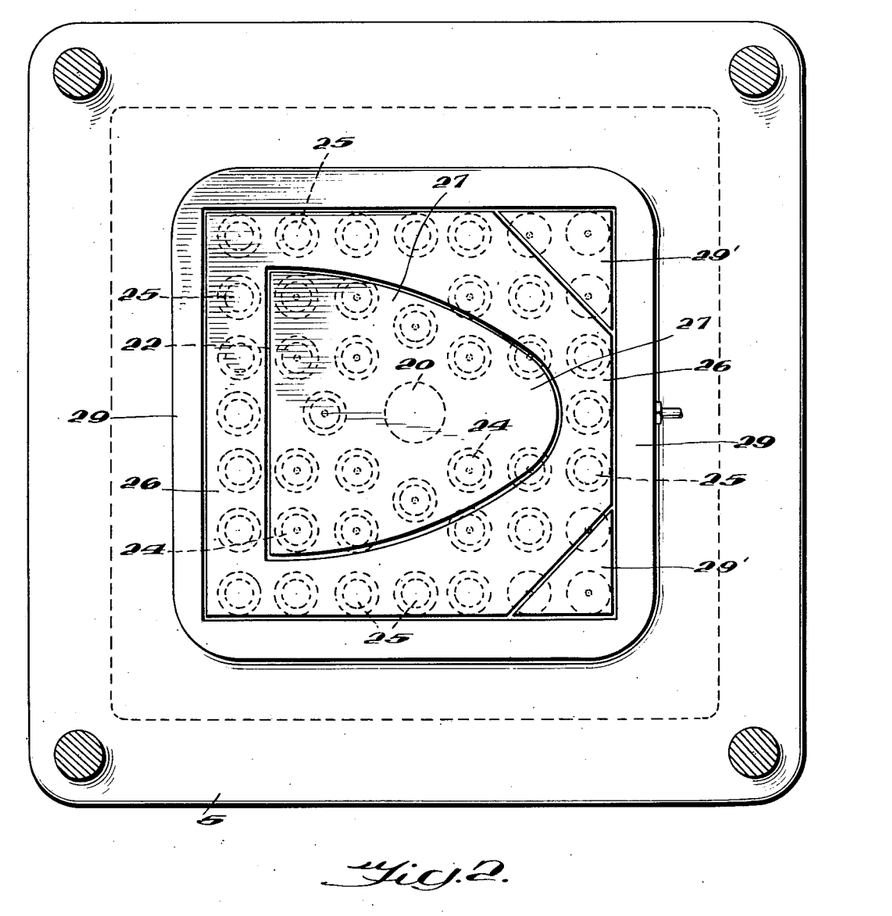
Figure 2 is a plan view of the base member of the apparatus.

Figure 2 shows the base assembly described above in plan view. Block 27 is shown, for example, contoured so that sheet metal formed thereon will assume the shape of a nose rib for an airplane structure. This block may be of hard wood, pressed wood compositions, or metal, depending upon the degree of resistance required in the forming operation. Surrounding block 27 is templet 26. Templet 26 is supported by posts 25 positioned in selected openings in the bolster plate, so that the load on the templet is distributed over movable platform 19 when pressure is applied during the forming operation. The area outside of templet 26 is filled by filler strips 29. If it is desired to make templet 26 of an irregular contour, auxiliary filler strips or blocks such as 29' may be used.

In forming a part with the apparatus described above, it is most important in the complex forms to control or vary the pressure exerted by the rubber during the forming operation for different depths of form. For example, the formed part may be 3" deep. The shape or contour of the form block may be such that it is desirable to apply an initial pressure before forming begins. During the first inch of downward travel of the head, the pressure exerted by the rubber may be of a certain quantity. For the next inch of travel, it may be desirable to increase or decrease the pressure, and for the last inch of travel, it might be desirable to change the pressure, exerted by the member in the forming operation, a considerable amount. This is accomplished by the hydraulic electric control shown in Figures 3 to 8.

Figure 3:
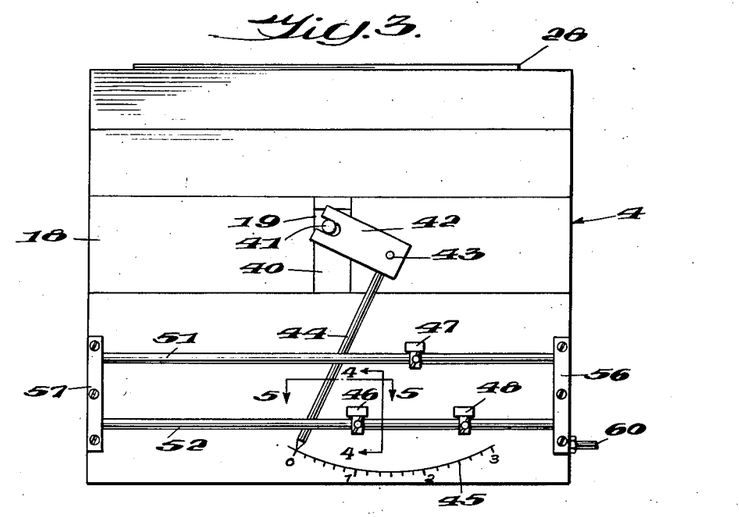
Figure 3 is a front elevational view of the base member showing the mechanism for actuating the micro-switches of the control circuit.
Figure 4:
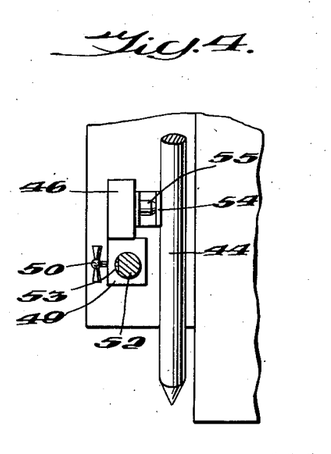
Figure 4 is a fragmentary sectional view taken on the line 4—4 of Figure 3.
Figure 5:
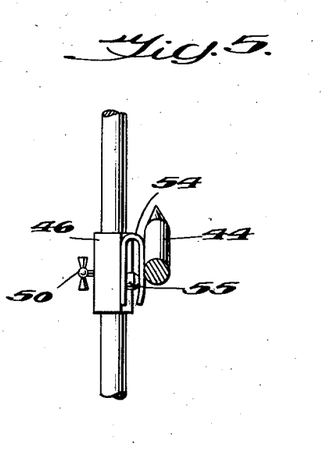
Figure 5 is a fragmentary sectional view taken on line 5—5 of Figure 3.

Base member 4, shown in Figure 3, has a slot 40 formed in the side of side member 18. A pin 41 extends outwardly through slot 40 and is mounted in the edge of movable platform 19. Pin 41 is engaged by the forked end of member 42 which is pivoted at 43 on side member 18. Pointer 44 acts as an indicator of the depth of travel of movable platform 19 on scale 45 and as an actuator for micro-switches 46, 47 and 48. These micro-switches, as shown in Figure 4, are mounted on a supporting bracket 49 having a thumb screw 50. Rods 51 and 52 have a flat side so that when thumb screws 50 are tightened the bracket and, thereby the micro-switch, will be maintained in a predetermined position. Each of the micro-switches has a spring clip 54 mounted over switch button 55. One end of the spring clip is secured to the body of the switch around the button, and the free end of the spring is contoured so that as member 44 moves back and forth past the switches with the motion of movable platform 19, the switches are actuated to make or break electrical contact in the hydraulic control circuit. Rods 51 and 52 are supported by brackets 56 and 57 on the outside of base member 4. Micro-switches 46 to 48 can be moved along the rods and arranged so that the electrical control circuit may be opened or closed for any depth of travel of platform 19. The significance of this will be seen more readily from a consideration of the hydraulic circuit with which the electrical circuit is associated.

Figure 6:
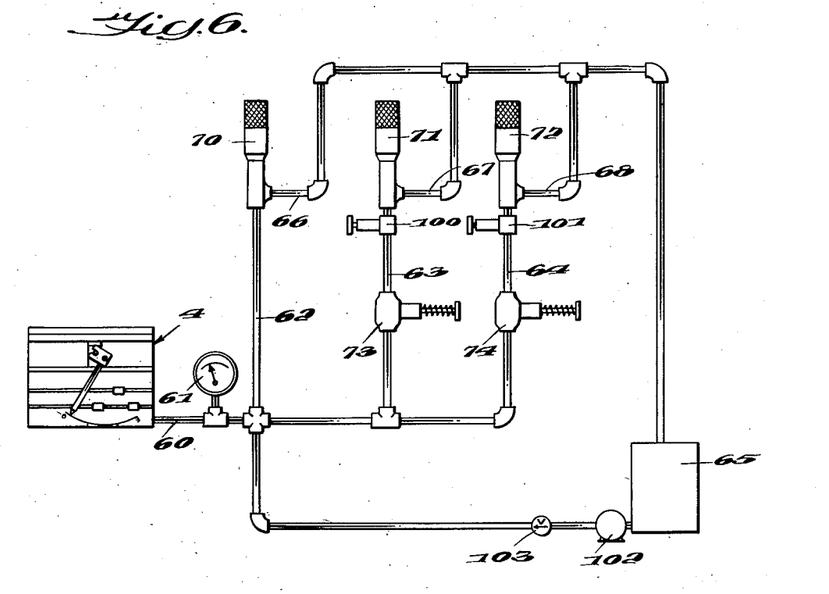
Figure 6 is a hydraulic circuit diagram.

Figure 6 shows base member 4 with the above described arrangement of depth indicator and micro-switch controls. Conduit or manifold 60 is secured to passage 13 in the base member. Pressure gauge 61 is included in the hydraulic circuit to give the indication of pressure at any time in the circuit. The hydraulic circuit associated with the base member consists essentially of three parallel paths 62, 63 and 64 between the base member and a hydraulic reservoir 65. It will be seen, from a consideration of the structure of the base member and the head mounted in a hydraulic press, that if the head is pressed down by the press on the base member, the pressure on the sheet 28 to be formed, will be increased. Templet 26, supported by post 25 on platform 19, and pistons 14 will resist any deformation of sheet 28. The hydraulic fluid in cylinders 11 will, of course, be subjected to pressure as the head is moved down over the base by the hydraulic press. The pressure will be built up by reason of the force exerted by the head on sheet 28 and templet member 26. The function of the hydraulic system communicating with the hydraulic fluid in cylinders 11 is to control the resistance of the templet member 26 to pressure exerted by the head moved by the press. In the conventional rubber form press, the edges of sheet 28 overhanging die block 27 would be bent downwardly in a badly wrinkled or fluted flange. If the hydraulic system resists the flow of fluid so that a predetermined pressure can be built up in cylinders 11, a large pressure can be built up by the rubber block 2 on sheet 28. Above a predetermined pressure, the hydraulic system will permit some flow therethrough, so that templet 26 will move downwardly under the pressure and the predetermined initial pressure will form sheet 28 around die block 27. As the motion of platform 19 continues downwardly under the action of the head of the press, the flow from cylinders 11 can be controlleed through the three parallel paths of the hydraulic system by the electrical control circuit to give a variety of increase or decrease of pressure as the metal is formed further down the sides of die block 27.

The hydraulic system shown in Figure 6 is generally intended to provide three parallel paths 62, 63 and 64 in which are inserted relief valves 70, 71 and 72 which may be set to provide for the passage of fluid through the system under different pressure conditions. These valves 70, 71 and 72 may also be referred to as individually adjustable pressure control valves. Valves 73 and 74 are solenoid-operated shut-off valves, that is, these valves are normally open when the coils of the solenoid are deenergized and when energized, close to preclude the passage of fluid through that branch of the system.

Figure 7:
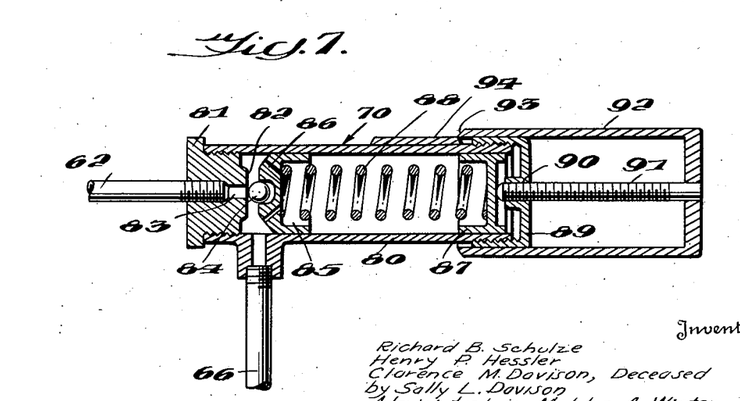
Figure 7 is a sectional view of the cylindrical pressure regulator valve.

The pressure relief valves 70, 71 and 72 are similar, and the construction of these valves is shown in detail in Figure 7. The valve has a tubular body member 80 having a plug 81 in one end into which pipe 62 is threaded. Plug 81 has a flat surface 82 on the inner side, through which bore 83 extends. A ball valve 84 is carried in a recess in the end of a member 85 which slides in tubular body member 80. Apertures 86 are provided in member 85 to equalize the pressure on both sides of member 85. Tension regulating member 87 slides in tubular member 80. Spring 88 extends between members 85 and 87. Cap 89 is secured to the end of tubular member 80 and is provided with a threaded opening 90 through which extends threaded rod 91. Cylindrical sleeve 92 is secured on the outer end of rod 91 to turn therewith. Sleeve 92 extends over the periphery of cap 89, and beveled edge 93 thereof slides along a pad 94 mounted on the outside of tubular member 80 as sleeve 92 is rotated. The rotation of sleeve 92 causes threaded member 91 to move member 87 toward or away from member 85, thereby increasing or decreasing the tension on spring 88. By thus regulating the spring under tension in the relief valve, the ball may be pressed against the seat to prevent the flow of fluid from pipe 62 to pipe 66, over a wide range of pressure. Pad 94 carries a calibration which cooperates with indicia on beveled edge 93, so that sleeve 92 may be so positioned that relief valve action will be obtained for a wide range of predetermined pressures.

It can readily be seen that with the above described pressure relief valve, that valves 70, 71 and 72 may be set for different pressures and that as the pressure in the system is built up, due to the force exerted by the hydraulic press in the forming operation, the relief valves 70, 71 and 72 will open in a predetermined sequence in accordance with the pressure at which each one is set and the position of solenoid-operated valves 73 and 74, that is, whether open or closed. Examples of the operation of the system will be given later.

Figure 8:
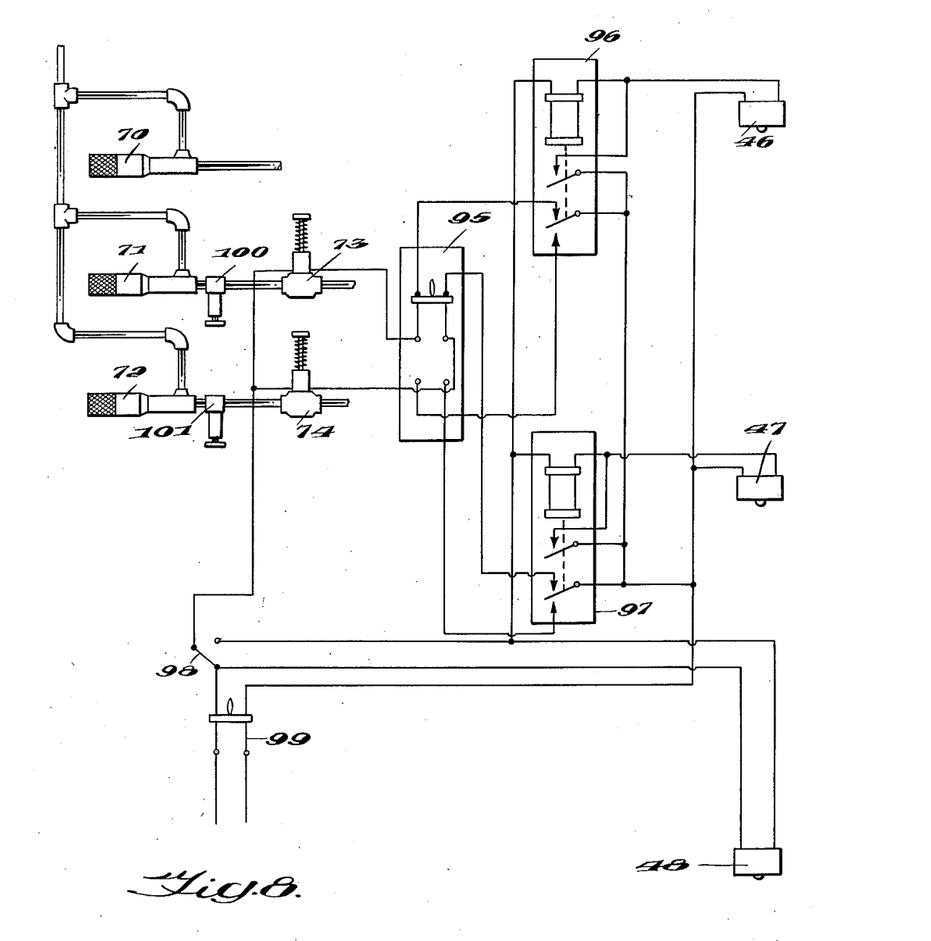
Figure 8 is an electrical circuit diagram for the control of the hydraulic circuit.

The electrical control circuit which controls the operation of the hydraulic circuit is shown in Figure 8. The electrical circuit includes, in addition to solenoid-operated valves 73 and 74 and micro-switches 46 to 48, a circuit selector switch 95 and relays 96 and 97. Solenoid valves 73 and 74 are normally open, permitting the passage of fluid when the solenoid coils are deenergized. Micro-switches 46 and 47 are normally open. Micro-switch 48 is normally closed, and when this switch is actuated, the circuit is opened which deenergizes the relays 96 and 97 to restore the valves to the normally open position. When switch 95 is in the "up" position, the solenoid valves are open and will not be closed until micro-switches 46 and 47 are actuated. When switch 95 is in the "down" position, the solenoid valves are closed and will open when switches 46 and 47 are actuated to energize relays 96 and 97. In other words, micro-switches 46 and 47 act as the operating means for solenoid valves 73 and 74, for when these switches close to energize relays 96 and 97, depending upon the position of switch 95, the solenoid valves will be opened or closed. Manual switch 98 selectively puts micro-switch 48 in or out of the circuit. Switch 99 is a line switch.

Restrictor valves 100 and 101 are intended to regulate the flow through the relief valves 71 and 72, respectively. By adjusting restrictor valves 100 and 101, the curve of pressure rise can be changed from a step-by-step flow pattern, depending upon the pressure setting in the relief valve, into a somewhat smooth, continuous curve, if the flow upon the opening of valves 71 and 72 is throttled or restricted, rather than being accomplished by a sudden burst of flow as the relief valve opens. A source of fluid pressure indicated as 102 may be a pump, accumulator, or the like, to force hydraulic fluid through check valve 103 into the cylinders 11 to raise pistons 14 as the head of the press is raised after the forming operation. The fluid pressure from source 102 thus forms an excellent means of stripping the part from the die after forming.

For an example of a typical forming operation of the apparatus, let us assume that a part is being formed that requires uniform resistance throughout the entire stroke of a pressure of, for example, 3000 p. s. i. The adjusting sleeves of relief valves 70, 71 and 72 should be set to open at 3000 p. s. i. for uniform resistance throughout the entire stroke. An electric control of the hydraulic circuit will not be required. Since the circuit will be deenergized, the actuation of switches 46 to 48 will be without effect. The piece of material to be formed is placed in the proper position over the form block. The ram of the press is actuated to descend and hydraulic pressures will immediately be built up in the system to 3000 p. s. i. As the ram of the press continues to descend, the pressure will be maintained by the relief valves 70, 71 and 72, and the excess of the hydraulic fluid will be vented therethrough. All three paths, 62 to 64, in the hydraulic system will be open, because solenoid valves 73 and 74 are normally open.

If the forming operation requires a resistance of 2000 p. s. i. initially, and a gradual building of the resistance up to 5000 p. s. i. at or near the end of the stroke, the following setting will be required. Relief valve 70 will be set to open at 5000 p. s. i. Relief valves 71 and 72 will be set to open at 2000 p. s. i. Restrictor valves 100 and 101 are adjusted to restrict the flow of fluid to relief valves 71 and 72. By a suitable adjustment of the restrictor valves which meter the flow of fluid through these paths, any type of increasing pressure curve can be developed. No electric circuit operation will be required.

When the forming operation requires an increase in rise of resistance pressure in definite steps and at specific points in the stroke, let us say, for example, 2000 p. s. i. is initially required and a pressure of 5000 p. s. i. after a predetermined depth of form has been achieved, the following setting would be required. Switch 95 is placed in the "up" position, which, of course, places the solenoid valves in open position. Relief valve 70 is set to open at 5000 p. s. i. Relief valve 71 is set to open at 2000 p. s. i. Relief valve 72 is set to open at 3000 p. s. i. Micro-switch 46 is set to close solenoid valve 73 when the forming operation has progressed ⅛". Micro-switch 47 is set to close solenoid valve 74 when the forming operation has progressed 1". Thus, it will be seen that a pressure of 2000 p. s. i. will be maintained during and immediately after starting the forming operation, and the pressure will be built up to 5000 p. s. i. when the forming operation has progressed to a 1" depth. Thereafter, the 5000 p. s. i. will be maintained for the balance of the stroke. It is to be understood that restrictor valves 100 and 101 can be employed to smooth out the transition of 2000 to 3000 to 5000 p. s. i. in this operation.

For a forming operation requiring 4000 p. s. i. initially after starting, and thereafter reducing the pressure to 3000 p. s. i. after 1" depth of form and further lowering the pressure to 2000 p. s. i. at a point of 1½" depth of form and maintaining the 2000 p. s. i. for the balance of the stroke, the following setting is required. Selector switch 95 must be placed in the "down" position, thus closing both solenoid valves 73 and 74. Relief valve 70 is set to open at 4000 p. s. i. Relief valve 71 is set to open at 3000 p. s. i. Relief valve 72 is set to open at 2000 p. s. i. Micro-switch 46 is moved along rod 52 so that it will be actuated by pointer 44 when the forming operation has reached the depth of 1". Micro-switch 47 is similarly set to be actuated when the forming operation has reached 1½" from the start. The actuation of switches 46 and 47 at the predetermined depth of form will open solenoid valves 73 and 74 to give the high pressure initial operation and subsequent operations at decreased pressures as described above.

The form of apparatus shown in Figure 9 differs from that shown in Figure 1 in that it is a larger unit and has been modified in structure to dispense with filler blocks 29 described in connection with Figure 1. The base member 104 is substantially the same as that previously described, except in that it includes many more pistons 114. Movable platform 119 is mounted on pistons 114 and moved thereby. Pin 141 is mounted in the edge of member 119 and performs the same function, in cooperation with pointer 44 and micro-switches 146, 147 and 148, as is performed by the corresponding structure in the apparatus described in connection with Figure 1. Bolster plate 121 is similar in structure and function to the previously described bolster plate 21. Templet member 126 differs from that described above in that it is co-extensive with aperture 133 formed in head member 131. The forming block, or die 127, is shown in this embodiment of such a contour as would be necessary for forming an airplane engine exhaust stack section. Templet member 126 surrounds form block 127 and supports a sheet of material to be formed over the form block until the pressure caused by the motion of the hydraulic press exceeds that which the hydraulic system is designed to resist. The templet member then moves downwardly, permitting the sheet to be formed around the die. The outer edges of templet 126 engage the aperture in plate 132 of head 131. The filler blocks and dimensions of the bolster plate, described in Figure 1, are thus eliminated. It can readily be seen that the opening in member 132 can be made smaller to fit smaller templets, which in time will greatly increase the available unit pressure for the forming operation of heavier sheet stock.

Figures 9, 10, 12, 13:
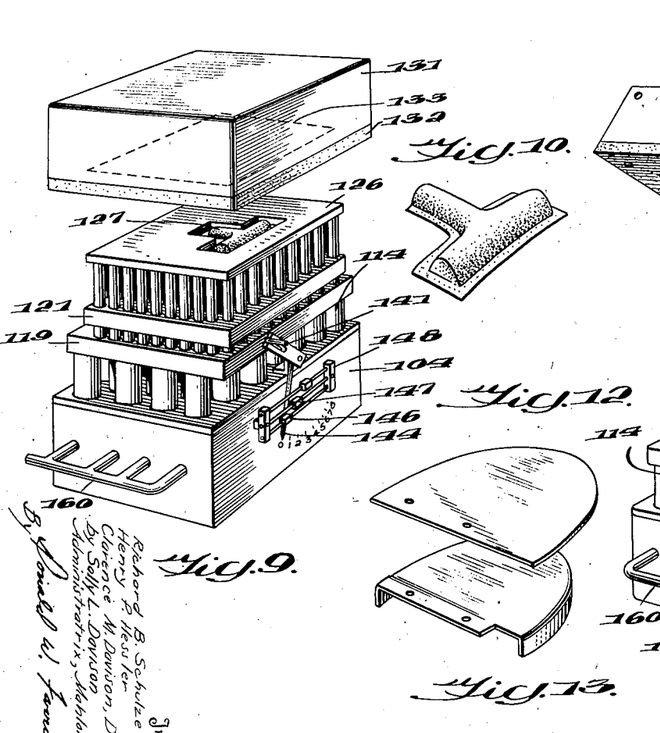
Figure 9 shows a modified form of the apparatus.
Figure 10 is an enlarged view of an exhaust stack formed as shown in Figure 9.
Figure 12 shows a blank of sheet metal prior to forming.
Figure 13 shows the blank formed in the apparatus.

Figure 10 shows the part obtained from a die such as shown in Figure 9 prior to the trimming operations.

Figure 11:
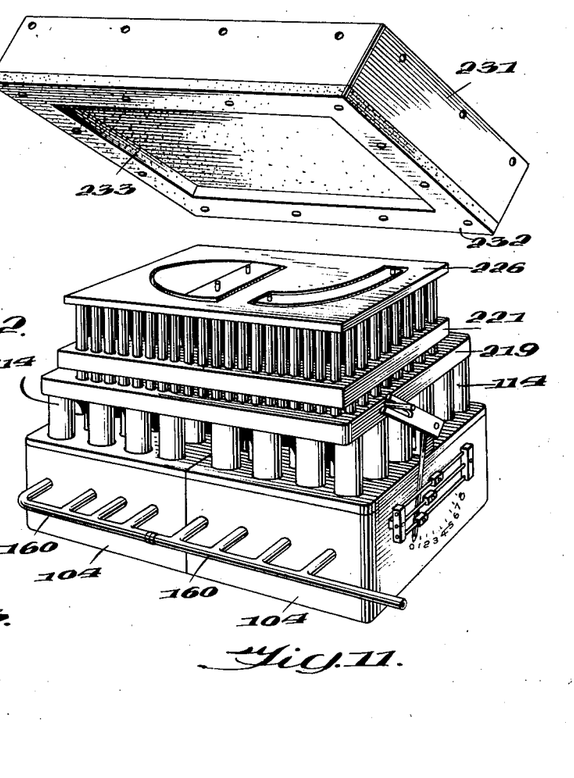
Figure 11 shows the use of two similar units with a modified head for forming large parts.

Figure 11 shows two base assemblies 104 placed side by side with their hydraulic systems 160 and 160' interconnected to a common hydraulic system, such as described in Figures 6 to 8, inclusive. Cylinders 114 of the units support a double size movable platform 219. Bolster plate 221 and templet member 226 correspond to the bolster plates and templets described in connection with Figure 9. Head 231 has a sealing ring 232 which has an aperture 233 corresponding to the outer dimensions of templet 226. With this arrangement, it is possible to form one large part and/or at the same time several small parts. If a large part is formed, it is desirable to distribute the smaller parts to be formed throughout the available area to distribute and equalize the balance during the forming operation.

Figure 12 shows a blank that may be placed over locater pins in the forming die to form the flanged part shown in Figure 13. The blank is so calculated as to extend down over the sides of the die that the finished flange may be formed on the part and no trimming operation will be required.

Thus, it will be seen that an apparatus is provided in which parts may be formed by a rubber pressure pad wherein the only source of pressure is derived from the movement of the hydraulic press head, and the pattern of pressure for predetermined depths of draw can be altered or varied by controlling the pattern of hydraulic resistance in the base block to the force of the descending press head.

It is to be understood that certain changes, alterations, modifications and substitutions can be made without departing from the spirit and scope of the appended claims.

We claim as our invention:

1. In a cushion control system for a press having a base and a member mounted for movement toward and away from said base, means including a fluid pressure chamber for opposing movement of said member toward said base in accordance with the fluid pressure in said chamber and comprising a plurality of individually adjustable pressure control valves for controlling the pressure within said chamber, conduits connections said valves to said chamber, a plurality of solenoid-actuated valves in said conduits for selectively controlling communication between the individual pressure control valves and said chamber, means including a plurality of switches for causing actuation of said solenoid-actuated valves, and means connected for movement in accordance with the movement of said member for sequentially operating said switches as said member moves toward said base to cause actuation of said solenoid-actuated valves in predetermined sequence, whereby the pressure in said chamber and the resulting resistance to movement of said member toward said base may be caused to vary in a predetermined manner during such movement.

2. In a cushion control system for a press having a base and a member mounted for movement toward and away from said base, means including a fluid pressure cylinder and a piston operable therein for opposing movement of said member toward said base in accordance with the fluid pressure in said cylinder and comprising a plurality of conduits connected to said cylinder and discharging exteriorly thereof, an adjustable pressure control valve governing the discharge from each of said conduits, a quick acting valve in at least two of said conduits between the corresponding pressure control valve and the cylinder for selectively establishing or interrupting communication between the cylinder and said corresponding pressure control valve, and an individual operating means for each quick-acting valve, said operating means being operated in a sequential manner, by movement of said member toward said base, to cause actuation of said quick-acting valves in predetermined sequence, whereby the pressure in said cylinder and the resulting resistance to movement of said member toward said base may be caused to vary in a predetermined manner during such movement.

3. In a cushion control system for a press having a base and a member mounted for movement toward and away from said base, means including a fluid pressure chamber for opposing movement of said member toward said base in accordance with the fluid pressure in said chamber and comprising a plurality of conduits connected to said chamber, an adjustable pressure control valve governing the discharge from each of said conduits, a quick acting valve in at least two of said conduits between the corresponding pressure control valve and the chamber for selectively controlling communication between the chamber and said corresponding pressure control valve, an adjustable means operable in response to arrival of said member at a preselected position for actuating each of said quick acting valves and a settable restrictor valve in each of the conduits provided with said quick-acting valves.

4. In a cushion control system for a press having a base and a member mounted for movement toward and away from said base, means including a fluid pressure chamber for opposing movement of said member toward said base in accordance with the fluid pressure in said chamber and comprising a manifold receiving the discharge from said chamber, a plurality of branch conduits connected to said manifold, an adjustable pressure control valve governing the discharge from each of said conduits, control means in at least two of said conduits between the corresponding pressure control valve and the manifold for selectively controlling communication between the chamber and said corresponding pressure control valve, and an individual operating means for each control means, said operating means being operated in a sequential manner, by movement of said member toward said base, to cause actuation of said control means in a predetermined sequence, whereby the pressure in said chamber and the resulting resistance to movement of said member toward said base may be caused to vary in a predetermined manner during such movement.

5. In a cushion control system for a press having a base and a member mounted for movement toward and away from said base, means including a fluid pressure chamber for opposing movement of said member toward said base in accordance with the fluid pressure in said chamber and comprising a plurality of individually adjustable pressure control valves for controlling the pressure within said chamber, conduits connecting said valves to said chamber, a plurality of electrically-actuated valves in said conduits for selectively controlling communication between the chamber and the individual pressure control valves, electrical circuit means including a plurality of electric switches for causing actuation of said electrically-actuated valves and a circuit selector switch for controlling the normal position of said electric switches, said circuit selector switch when in a first position, causing said electric switches to be held in a normally-open position, and when in a second position, causing said electric switches to be held in a normally-closed position, and means connected for movement in accordance with the movement of said member for sequentially operating said electric switches as said member moves toward said base to cause actuation of said electrically-actuated valves in predetermined sequence, latter valves being closed in sequential order when said selector switch is in said first position, and opened in sequential order when said selector switch is in said second position, so as to cause the pressure in said chamber and the resulting resistance to movement of said member toward said base to vary respectively in an increasing or decreasing manner, in accordance with the position of said selector switch.

References Cited in the file of this patent

UNITED STATES PATENTS

| | | |
|---|---|---|
| 1,503,131 | Nelson | July 29, 1924 |
| 1,745,549 | Marghitan | Feb. 4, 1930 |
| 2,382,046 | Flowers et al. | Aug. 14, 1945 |